United States Patent [19]

Habermann

[11] Patent Number: 4,827,169
[45] Date of Patent: May 2, 1989

[54] HYBRID FLUID BEARING WITH STIFFNESS MODIFIED BY ELECTROMAGNETIC EFFECT

[75] Inventor: Helmut Habermann, Vernon, France

[73] Assignee: Societe de Mecanique Magnetique, Saint-Marcel, France

[21] Appl. No.: 135,821

[22] Filed: Dec. 21, 1987

[30] Foreign Application Priority Data

Dec. 31, 1986 [FR] France ................. 86 18439

[51] Int. Cl.⁴ .......................... H02K 5/16; G05B 5/01
[52] U.S. Cl. ................................. 310/90.5; 384/114; 384/448
[58] Field of Search .............. 310/90.5; 384/100, 114, 384/118

[56] References Cited

U.S. PATENT DOCUMENTS

| | | | |
|---|---|---|---|
| 2,684,272 | 7/1954 | Annen | 384/118 |
| 4,023,920 | 5/1977 | Bächler et al. | 417/354 |
| 4,121,143 | 10/1978 | Habermann et al. | 318/629 |
| 4,141,604 | 2/1979 | Habermann et al. | 310/90.5 |
| 4,473,259 | 9/1984 | Goldowsky | 310/90.5 |
| 4,626,754 | 2/1986 | Habermann et al. | 310/90.5 |
| 4,629,261 | 12/1986 | Eiermann et al. | 310/90.5 |
| 4,629,262 | 12/1986 | Hamilton | 310/90.5 |
| 4,650,132 | 3/1987 | Graf et al. | 310/90.5 |
| 4,652,820 | 3/1987 | Maresca | 310/90.5 |
| 4,683,391 | 7/1987 | Higuchi | 310/90.5 |

FOREIGN PATENT DOCUMENTS

| | | | |
|---|---|---|---|
| 0054617 | 6/1982 | European Pat. Off. | 310/90.5 |
| 0071456 | 2/1983 | European Pat. Off. | 310/90.5 |
| 2379732 | 9/1978 | France . | |

Primary Examiner—Patrick R. Salce
Assistant Examiner—D. L. Rebsch
Attorney, Agent, or Firm—Weingarten, Schurgin, Gagnebin & Hayes

[57] ABSTRACT

The hybrid fluid bearing comprises a fixed body, a tubular part made of a nonmetallic material, mounted inside the body and having an internal bore which defines a cylindrical bearing surface, leaving a small amount of clearance relative to the shaft, which is provided with an annular magnetic circuit constituted by rectified laminations. A fixed magnetic circuit made of laminations defines a series of poles and notches disposed concentrically around the outside of the tubular part, with electromagnetic windings being disposed in the notches around the poles and being fed with electricity from servocontrol loops which receive signals from at least one vibration detector disposed on the fixed body. The cylindrical bearing surface has a series of recesses formed therein, said recesses being distributed around the circumference of the tubular part and being connected to means for feeding them with fluid and for removing fluid therefrom. Sealing means are also provided. This hybrid fluid bearing has the capacity of being heavily loaded while simultaneously highly attenuating vibrations reaching the fixed body thereof.

10 Claims, 2 Drawing Sheets

HYBRID FLUID BEARING WITH STIFFNESS MODIFIED BY ELECTROMAGNETIC EFFECT

FIELD OF THE INVENTION

The present invention provides a hybrid fluid bearing for a rotary shaft subjected to radial loads, the bearing comprising:

a fixed body;

a tubular part mounted inside the fixed body and having an internal bore which defines a cylindrical bearing surface that leaves a small basic clearance about the shaft;

a series of recesses formed in said cylindrical bearing surface, said recesses being distributed around the circumference of the tubular part;

means for feeding the recesses with fluid and for evacuating fluid from the recesses; and sealing means formed between the tubular part and the shaft on either side of that portion of the tubular part which has said recesses.

BACKGROUND OF THE INVENTION

A fluid bearing such as a gas bearing or an oil bearing, and in particular a hydrodynamic bearing, tends to transmit a force to its casing which is proportional firstly to the stiffness of the bearing and secondly to its eccentricity, i.e. the distance between the inertia axis of the rotor and the axis of the bearing. Regardless of how well the rotor is balanced, the off-balance is never completely eliminated. The force transmitted to the casing thus tends to set up vibrations therein which in numerous cases are detrimental to the environment in which the rotary machine is located.

In order to remedy this drawback, proposals have already been made to compensate the forces exerted on the casing of the machine by a hydrodynamic bearing by using electrodynamic exciters which exert active damping on the casing, tending to reduce the action of the forces exerted thereon by the hydrodynamic bearing. Such a device which acts directly on the structure to be stabilized is not completely satisfactory since its action cannot avoid residual vibration, and above all it is not possible to make a device which is compact.

U.S. Pat. No. 4,626,754 describes a device for reducing the vibrations of rotary machines and applicable to the case where the rotor is mounted in the casing by means of an active magnetic suspension which includes at least one radial magnetic bearing. In this prior device, the vibration detectors disposed on the casing use the servocontrolled circuits of the active magnetic bearings to reduce the vibrations to which the casing is subjected. Such an active magnetic suspension of the rotor could thus be juxtaposed with a hydrodynamic bearing suspension in order to use the negative stiffness of the magnetic bearing to compensate for the disturbing forces created by the hydrodynamic bearings. However, this solution suffers from drawbacks due to the fact that it cannot prevent parasitic couples appearing on the stator due to the juxtaposition of axially offset magnetic and hydro-dynamic bearings.

The aim of the present invention is to remedy the above-mentioned drawbacks by providing a compact device capable of effectively reducing, and even of eliminating, the vibrations generated in the casing of the rotary machine by virtue of the machine having a fluid bearing for supporting its rotor.

SUMMARY OF THE INVENTION

According to the invention, these aims are achieved by means of a hybrid fluid bearing of the type defined under the heading "Field of the Invention":

wherein said tubular part is made of a nonmetallic material and has a thickness lying between about 1.5 mm and about 3 mm;

wherein the rotary shaft is provided with an annular magnetic circuit constituted by rectified laminations which extend axially over at least a portion of the peripheral zone of the shaft facing the recesses provided in the tubular part;

wherein a fixed magnetic circuit constituted by a stack of laminations defines a series of poles and notches and is mounted concentrically about the tubular part on the opposite side thereof from its bearing surface, and extends axially over the zone of the shaft which is provided with an annular magnetic circuit; and wherein electromagnetic windings are disposed in said notches around said poles of the fixed magnetic circuit and are fed from servocontrol loops which receive signals from at least one vibration detector disposed on said fixed body and in the vicinity of the bearing.

The electromagnetic means incorporated in the fluid bearing thus make it possible to modify the stiffness of the fluid bearing by compact means that do not introduce a parasitic couple, thereby using the negative stiffness conferred by the electromagnetic means to compensate the disturbing forces created by the fluid bearing because of defects in rotor balancing.

The tubular part whose thickness is preferably about 2 mm, is advantageously made of ceramic material and therefore does not give rise to disturbances in the gap between the fixed magnetic circuit and the magnetic circuit on the rotary shaft.

In accordance with the invention, at least two vibration detectors having nonparallel axes perpendicular to the axis $ZZ'$ of the shaft are disposed on the fixed body, and the servocontrol loops receiving the signals from the vibration detectors are constituted by high-gain narrow-band selective feedback circuits having a center frequency synchronized with a reference frequency constituted by the rotation frequency of the shaft or a harmonic frequency of said rotation frequency.

Advantageously, the electromagnet windings are fed from servocontrol loops, with at least some of them receiving the signals from at least one of the detectors for detecting the radial position of the shaft and located in the immediate proximity of the fluid bearing.

In this case, the electromagnetic means may serve as an emergency magnetic bearing capable of carrying a load in the event of the fluid support means breaking down.

BRIEF DESCRIPTION OF THE DRAWINGS

An embodiment of the invention is described by way of example with reference to the accompanying drawings, in which.

MORE DETAILED DESCRIPTION

Figure 1:
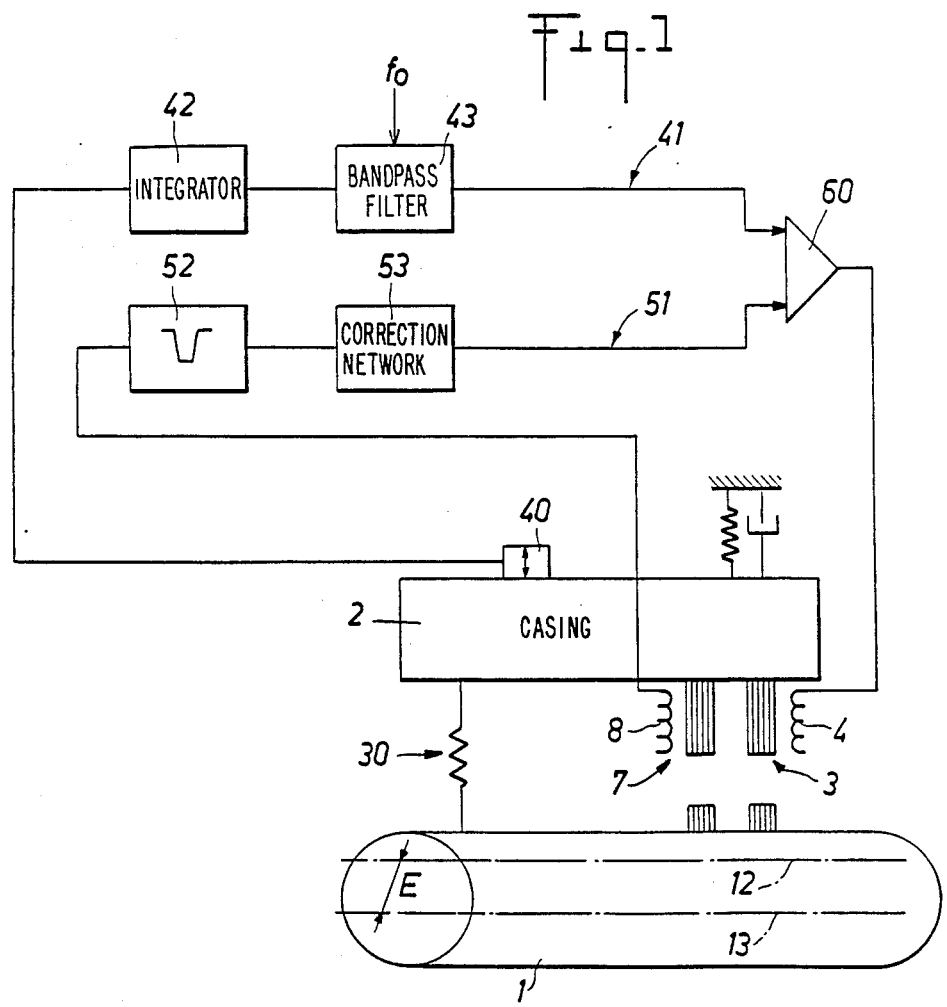
FIG. 1 is a diagram showing the essential components of a hybrid fluid bearing in accordance with the invention.

FIG. 1 is a diagram showing the essential components of a rotary machine which comprises a rotor 1 mounted inside a casing 2 by means of a fluid bearing 30. Dot-dash line 12 represents the inertia axis of the rotor 1 which is different from the geometrical axis of the rotor 1 which is represented by dot-dash line 13, with said axes presenting the fluid bearing 30 with an eccentricity E.

In the absence of any compensation device, the fluid bearing 30 (which in the present description is considered as being a bearing of the hydrodynamic type) transmits a force Fh to the casing 2 proportional to the stiffness Kh of the hydrodynamic bearing 30 and to the above-defined eccentricity E.

The configuration of the hybrid hydrodynamic bearing in accordance with the invention seeks to keep the casing 2 still by preventing forces being transmitted from the rotor 1 to the casing 2 by the technique of cancelling the overall stiffness of the bearing assembly constituted by hydrodynamic support means 30 and by servocontrolled electromagnetic means 3 which are incorporated in the hydrodynamic bearing and which act in the manner of an active radial magnetic bearing.

As a result, the rotor 1 rotates about its inertia axis 12 and there is no off-balance force to be transmitted.

If E is the eccentricity of the rotor 1, i.e. the distance between the inertia axis 12 and the axis 13 of the hydrodynamic bearing 30, and if Kh is the stiffness of the hydrodynamic bearing 30 without its auxiliary electromagnetic means, then the force Fh transmitted to the casing 2 by virtue of the hydrodynamic bearing 30 is proportional both to E and to Kh. In order to compensate this force Fh, the auxiliary electromagnetic means 3 incorporated in the hydrodynamic bearing 30 must provide a force Fm equal to $-Fh$, i.e. they must provide negative stiffness Km to compensate the stiffness Kh of the hydrodynamic bearing.

This is possible in a narrow frequency band centered on a given frequency fo corresponding to the instantaneous rotation frequency of the rotor 1 or to a harmonic frequency thereof. To do this, a vibration sensor 40 placed on the casing 2 of the machine in the vicinity of the hydrodynamic bearing 30 delivers signals to an input integrator circuit 42 of a feedback loop including a bandpass filter 43 centered on the given frequency fo. The signals from the output of the bandpass filter 43 are then applied to a power amplifier 60 which feeds the windings 4 of the electromagnetic means 3 incorporated in the hydrodynamic bearing. A stiffness "hole" is thus set-up on the basis of the signals delivered by the vibration detectors 40 placed on the casing, thereby enabling the stiffness Kh of the hydrodynamic support means to be compensated.

Figure 2:
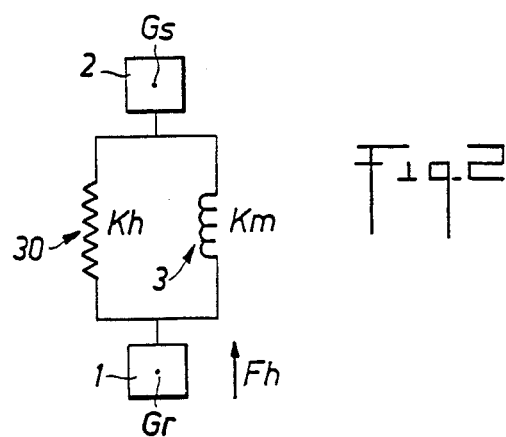
FIG. 2 is a symbolic diagram equivalent to the diagram of FIG. 1.

FIG. 2 symbolizes the force Fh applied to the casing 2 (whose center of gravity is Gs) by the hydrodynamic bearing because of an off-balance mass on the rotor 1 with a center of gravity of Gr. The auxiliary electromagnetic means 3 serve to set up a negative stiffness Km for compensating the stiffness of the fluid support means 30.

The vibration detectors 40 placed on the casing of the machine are constituted by accelerometers or by speed detectors and comprise at least two detectors whose sensitivity axes are oriented along two perpendicular directions X'X and Y'Y which are perpendicular to the axis ZZ' of the rotor 1.

FIG. 1 shows only the servocontrol loops that correspond to the direction X'X for controlling the current flowing through those windings 4 of the electromagnetic means 3 which act in the direction X'X. Entirely similar servocontrol loops are used to control the current flowing through those windings 4 of the electromagnetic means 3 which act in the direction Y'Y on the basis of detectors having their sensitivity axes oriented along the direction Y'Y.

The signals delivered by the vibration detectors 40 are applied to integrator circuits 42 which perform a single integration if the detectors 40 are speed sensors, or which perform a double integration if the detectors 40 are accelerometers.

The signals from the integrator circuit 42 are then applied to a bandpass filter 43 centered on a frequency of rotation fo. The frequency fo may correspond to the frequency of rotation f of the rotor 1 if the vibrations to which the casing 2 is subjected in the absence of the compensating means 3 are essentially due to the presence of the hydrodynamic bearing 30 per se. However, other auxiliary items on the rotor 1, e.g. sealing rings, may behave as pseudo-bearings and may setup disturbances at frequencies 2f, 3f, ... which are harmonics of the rotor's rotation frequency. It is advantageous to begin by using a spectrum analyzer connected to receive the signals provided by the vibration detectors 40 to establish which vibration frequencies are stable in the long term (which frequencies theoretically correspond to a multiple, e.g. f, 2f, 3f of the rotor's rotation speed) in order to make subsequent use of filters 43 which are centered on frequencies fo which correspond to the frequencies previously identified by Fourier analysis.

The vibration detectors 40 thus serve to control compensation of repetitive vibrations which stem from the rotor 1 and which, in the absence of the compensation means 3, are applied to the casing 2.

The servocontrol loop 41 which is essentially constituted by a vibration detector 40, an integrator circuit 42, a bandpass filter 43, and an amplifier 60 driving the windings 4 of electromagnets in the bearing 3, constitutes a high-gain and narrow-band selective feedback loop. A single output amplifier 60 is shown in the servocontrol loop 41; however the amplifier may naturally be associated in conventional manner with phase-shifting circuits for feeding diametrically opposite windings 4 on one or other of the directions X'X or Y'Y.

The electromagnetic means 3 may be force-controlled quite simply from the signals delivered by the vibration detectors 40 situated on the casing in the immediate vicinity of the hydrodynamic bearing 30. In this case, the electromagnetic means 3 correspond to an active magnetic bearing without any load-carrying function which acts solely for compensation purposes, and which does not co-operate with displacement detectors. The compensation provided by the magnetic bearing 3 on the basis of the vibration detectors 40 is intended essentially to counterbalance the disturbing effect due to the rotor being off-balance, which effect is transmitted to the hydrodynamic support means 30. However, the magnetic housing 3 may also simultaneously contribute to damping magnetic resonances applied to the casing 2 and having other sources.

Advantageously, a detector 7 for detecting the radial position of the rotor 1 relative to the casing 2 is also used in order to enable the magnetic bearing 3 to servocontrol position by virtue of a servocontrol loop 51, thereby enabling the magnetic bearing 3 to act as a load-carrying bearing in the event of the fluid support means 30 breakdown. The magnetic bearing 3 incorporated in the hydrodynamic bearing 30 thus also serves as an emergency bearing without the overall structure being modified.

The static position of the rotor 1 relative to the casing 2 is controlled by means of a conventional feedback loop 51 which receives the signals delivered by a detector 7 for detecting the position of the rotor 1 relative to the casing 2. The detector 7 may be of the inductive type and includes position detection components which are oriented along the two perpendicular directions X'X and Y'Y. Each of the two feedback loops 51 servocontrol the position of the rotor 1 along the directions X'X or Y'Y and comprises a signal-processing corrector network 53, e.g. of the PID type (where PID stands for Proportional-plus-Integral-plus-Derivative). The signals delivered by the corrector network 53 which is normally associated with linearizing means, are applied to a summing amplifier 60.

A network 52 for automatically balancing the rotor 1 may be incorporated in the servocontrol loop 51 in order to prevent the position detector 7 from transmitting an error signal to the magnetic bearing 3 based on the eccentricity between the axis of the position detector 7 and the rotation axis of the rotor 1. The automatic balancing network 52 may be constituted, for example, in the manner described in U.S. Pat. No. 4,121,143.

Figure 3:
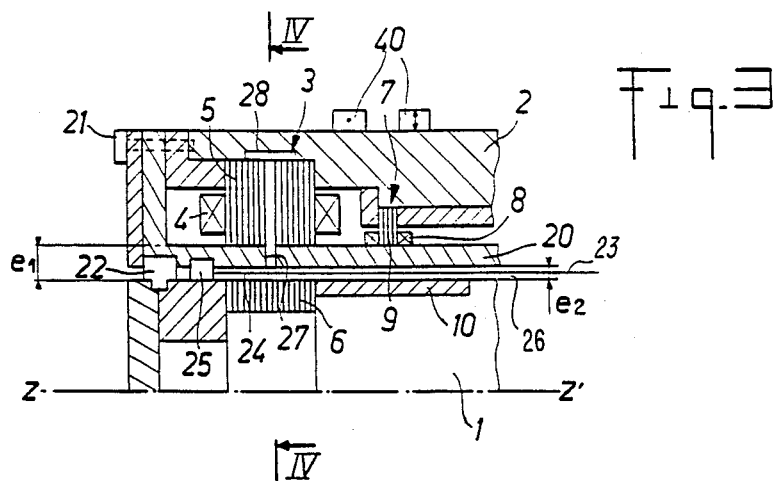
FIG. 3 is an axial half-section view through a hybrid fluid bearing in accordance with the invention on a plane III—III of FIG. 4.
Figure 4:
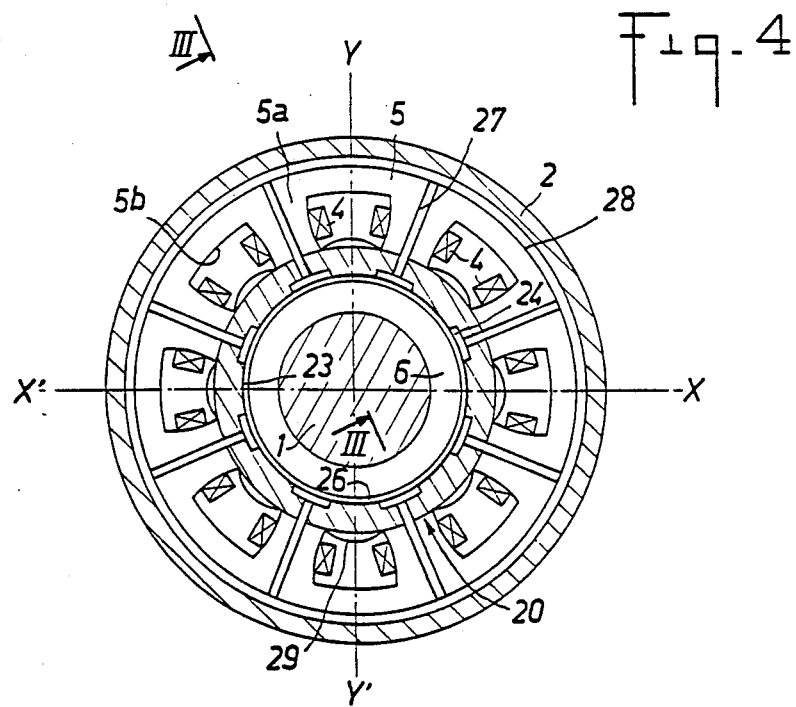
FIG. 4 is a cross-section on a plane IV—IV of FIG. 3.

There follows a description, with reference to FIGS. 3 and 4, of a particular embodiment of electromagnetic means 3 incorporated within a hydrodynamic bearing 30 in order to provide a hybrid bearing which is compact, which is simple in structure, which is suitable for preventing parasitic couples being set up by a suitable interaction between the hydrodynamic forces from the support 30 and the magnetic forces, and which serves to effectively suppress vibration at the casing 2.

The hybrid hydrodynamic bearing shown in FIGS. 3 and 4 comprises a fixed tubular part 20 made of a non-metallic and nonconducting material, e.g. a ceramic, which is fixed to the casing 2 and which has an internal bore forming a cylindrical bearing surface 23 which leaves a small basic clearance 26 around the peripheral surface of the rotor 1.

Recesses 24 (which define hydrodynamic effect voids if the fluid bearing is of the hydrodynamic type) are formed in the cylindrical surface 23 so as to provide clearance of thickness e2 relative to the peripheral surface of the rotor 1 (see FIG. 3), with the clearance of thickness e2 being greater than the basic clearance. The recesses 24 are regularly distributed in the circumferential direction around the bearing surface 23 as shown in FIG. 4. Annular passages 25 concentric with the rotor 1 and in communication with the recesses 24 may be formed on either side of the recesses 24, i.e. axially offset therefrom, in order to feed the recesses 24 with fluid and/or to evacuate fluid from said recesses. Sealing rings 22 are also provided at each end of the hydrodynamic bearing.

In an advantageous embodiment shown in FIGS. 3 and 4, fluid is injected into the recesses 24 in a radial direction via ducts 27 provided through the poles 5a of the fixed stator magnetic circuit 5 and through the tubular part 20 so as to open out into the recesses 24 which are located, in this case, in line with a corresponding pole 5a. The fluid injected via the orifices 27 is conveyed along an annular groove 28 in the casing 2 around the periphery of the stator magnetic circuit 5. Fluid may be evacuated via a groove such as groove 25 of FIG. 3 which is in communication with the recesses 24. Naturally, other configurations which are known in the field of fluid bearings may also be used so long as they are compatible with the presence of the magnetic circuit 5.

In order to ensure sealing for the stack of laminations constituting the stator magnetic circuit 5, the magnetic circuit 5 is embedded in a nonmagnetic material prior to the tubular part 20 being fitted over the ends of the poles 5a of the magnetic circuit 5.

The tubular part 20 fixed to the casing 2 by connection means 21, and its outer cylindrical face which does not have recesses, rests on the end faces of the poles 5a of the stator magnetic field 5 of the magnetic bearing 3 which is included within the hydrodynamic bearing. The rotor 1 per se has a magnetic circuit 6 located in its periphery in the zone facing the stator magnetic circuit 5, with the magnetic circuit 6 being constituted by a stack of laminations and with its outer peripheral surface which defines the basic clearance with the bearing surface 23 being trued-up.

The stator magnetic circuit 5 of the magnetic bearing 3 is itself constituted by a stack of laminations having notches 5b which receive electromagnetic windings 4 that are wound around the projecting poles 5a of the magnetic circuit 5 against which the tubular part 20 bears.

The gap e1 between the poles 5a of the fixed stator magnetic circuit 5 and the annular magnetic circuit 6 on the rotor 1 has a width lying between 1.5 mm and 3 mm, and is preferably about 2 mm wide. This relatively large gap is essentially determined by the thickness of the tubular part 20 which constitutes the sleeve of the hydrodynamic bearing 30 per se. The tubular part 20 may be reinforced, for example where it extends past the notches 5b of the stator magnetic circuit at 29.

The vibration detectors 40 are disposed on the casing 2 in the immediate vicinity of the magnetic bearing 3. When a detector 7 is used for detecting the radial position of the rotor 1, the detector is placed in the immediate proximity of the magnetic bearing 3, placing an annular magnetic circuit 10 formed on the rotor 1 adjacent to the magnetic circuit 6 of the magnetic bearing 3. The position detector 7 is advantageously of the inductive type, having a plurality of windings 8 mounted on a fixed magnetic circuit 9 with one end thereof being in contact with the face of the tubular part 20 that does not include recesses, and co-operating with the magnetic circuit 10 on the rotor 1 which is situated on the other side of the tubular part 20.

As shown in FIG. 4, the electromagnets of the magnetic bearing 3 are disposed in pairs on two fixed orthogonal axes X'X and Y'Y which are perpendicular to the axis of rotation ZZ' defined by the bearing, with the two electromagnets of any given pair being located diametrically opposite each other and each exerting an attractive force on the magnetic circuit 6 of the rotor 1 when the corresponding windings are fed with an electrical current. In the example shown, each electromagnet comprises two windings 4 which are connected in series.

The hybrid fluid bearing in accordance with the invention retains the advantages of fluid bearings, and in particular the possibility of withstanding short, heavy overloads, while making use of the electromagnetic means integrated in the bearing to very significantly suppress the disturbances which would otherwise be applied to the casing by a fluid bearing having a film of fluid. The invention is also particularly applicable to large, slow rotary machines.

I claim:

1. A hybrid fluid bearing for a rotary shaft subjected to radial loads, the bearing comprising:

a fixed body;

a tubular part mounted inside the fixed body and having an internal bore which defines a cylindrical bearing surface that leaves a small basic clearance about the shaft;

a series of recesses formed in said cylindrical bearing surface, said recesses being distributed around the circumference of the tubular part;

means for feeding the recesses with fluid and for evacuating fluid from the recesses; and sealing means formed between the tubular part and the shaft on either side of that portion of the tubular part which has said recesses;

wherein said tubular part is made of a nonmetallic material and has a thickness lying between about 1.5 mm and about 3 mm;

wherein the rotary shaft is provided with an annular magnetic circuit constituted by trued-up laminations which extend axially over at least a portion of the peripheral zone of the shaft facing the recesses provided in the tubular part;

wherein a fixed magnetic circuit constituted by a stack of laminations defines a series of poles and notches and is mounted concentrically about the tubular part on the opposite side thereof from its bearing surface, and extends axially over the zone to the shaft which is provided with said annular magnetic circuit; and wherein electromagnetic windings are disposed in said notches around said poles of the fixed magnetic circuit and are fed from servocontrol loops which receive signals from at least one vibration detector disposed on said fixed body and in the vicinity of the bearing.

2. A bearing according to claim 1, wherein the tubular part is about 2 mm thick.

3. A bearing according to claim 1, wherein the tubular part is made of a ceramic material.

4. A bearing according to claim 1, wherein the electromagnet windings are fed from servocontrol loops, at least some of which receive signals from at least one detector disposed in the immediate proximity of the hydrodynamic bearing for detecting the radial position of the shaft.

5. A bearing according to claim 4, wherein the detector for detecting the radial position of the shaft is of the inductive type.

6. A bearing according to claim 1, including at least two vibration detectors having nonparallel axes perpendicular to the axis ZZ' of the shaft and disposed on the fixed body, and wherein the servocontrol loops receiving the signals from the vibration detectors are constituted by high-gain narrow-band selective feedback circuits having a center frequency synchronized with a reference frequency constituted by the rotation frequency of the shaft or a harmonic frequency of said rotation frequency.

7. A bearing according to claim 6, wherein the vibration detectors are constituted by accelerometers, and wherein the servocontrol loops receiving the signals from the vibration detectors include respective input circuits that perform a double integration.

8. A bearing according to claim 6, wherein the vibration detectors are constituted by speed detectors, and wherein the servocontrol loops receiving the signals from the vibration detectors include respective input circuits performing a single integration.

9. A bearing according to claim 1, wherein the fixed ferromagnetic circuit is coated in a nonmetallic material prior to being put into contact with the tubular part.

10. A bearing according to claim 1, wherein the recesses are provided in portions of the tubular part facing the poles of the fixed magnetic circuit, and wherein the ducts for injecting fluid into recesses are disposed radially through the poles of the fixed magnetic circuit and through the tubular part.

* * * * *

UNITED STATES PATENT AND TRADEMARK OFFICE
CERTIFICATE OF CORRECTION

PATENT NO. : 4,827,169

DATED : May 2, 1989

INVENTOR(S) : Helmut Habermann

It is certified that error appears in the above-identified patent and that said Letters Patent is hereby corrected as shown below:

Column 2, line 19, "with an" should read --with said--.

Column 4, line 63, "magnetic housing 3" should read --magnetic bearing 3--.

Column 5, line 4, "breakdown." should read --breaking down.--.

Column 7, line 36, "to the shaft" should read --of the shaft--

Signed and Sealed this

Thirtieth Day of July, 1991

*Attest:*

HARRY F. MANBECK, JR.

*Attesting Officer*  *Commissioner of Patents and Trademarks*